United States Patent
Böer (12) 
(10) Patent No.: US 6,414,237 B1
(45) Date of Patent: Jul. 2, 2002

(54) SOLAR COLLECTORS, ARTICLES FOR MOUNTING SOLAR MODULES, AND METHODS OF MOUNTING SOLAR MODULES

(75) Inventor: Karl W. Böer, Kennett Square, PA (US)

(73) Assignee: AstroPower, Inc., Newark, DE (US)

( * ) Notice: Subject to any disclaimer, the term of this patent is extended or adjusted under 35 U.S.C. 154(b) by 0 days.

(21) Appl. No.: 09/616,353

(22) Filed: Jul. 14, 2000

(51) Int. Cl.[7] .............................. H01L 31/048; F24J 2/52
(52) U.S. Cl. ...................... 136/251; 136/244; 136/291; 126/623; 126/704; 438/64; 438/66; 52/173.3
(58) Field of Search .................................. 136/244, 251, 136/291; 126/623, 704; 438/64, 66; 52/173.3

(56) References Cited

U.S. PATENT DOCUMENTS

| | | | |
|---|---|---|---|
| 5,409,549 A | * | 4/1995 | Mori ........................... 136/244 |
| 5,762,720 A | * | 6/1998 | Hanoka et al. ............. 136/251 |
| 5,787,653 A | * | 8/1998 | Sakai et al. ................ 52/173.3 |
| 6,245,987 B1 | * | 6/2001 | Shiomi et al. .............. 136/244 |
| 6,300,555 B1 | * | 10/2001 | Kondo et al. ............... 136/244 |

FOREIGN PATENT DOCUMENTS

| JP | 60-50348 A | * | 3/1985 |
|---|---|---|---|
| JP | 10-266472 A | * | 10/1998 |

* cited by examiner

Primary Examiner—Alan Diamond
(74) Attorney, Agent, or Firm—Burr & Brown (57) ABSTRACT

There is provided a solar collector comprising at least one solar module; at least one solar module frame which supports the solar module; and at least one solar module bracket comprising a profile channel engagement hook, the profile channel engagement hook comprising a neck portion and a foot portion, the foot portion having a foot portion cross-sectional area in a first plane which is larger than a cross-sectional area of the neck portion in a second plane parallel to the first plane. There is also provided a profile channel attached to or integral with a support structure, the profile channel having at least one opening, the profile channel engagement hook engaging the opening such that the neck portion extends through the opening. There are also provided methods of making such solar collectors and methods of mounting such solar collectors on support structures.

23 Claims, 6 Drawing Sheets

SOLAR COLLECTORS, ARTICLES FOR MOUNTING SOLAR MODULES, AND METHODS OF MOUNTING SOLAR MODULES

FIELD OF THE INVENTION

The present invention is directed to solar collectors, articles for mounting solar collectors on a support structure, and methods of employing or making such collectors and articles.

BACKGROUND OF THE INVENTION

Solar modules, i.e., solar electrical modules (photovoltaic modules) and solar thermal modules, are of great importance, particularly in light of limitations and environmental concerns associated with other sources of energy.

As an example, especially photovoltaic (PV) modules, are conventionally mounted on roof surfaces by bolting or screwing to the roof structure a solar collector including a solar module frame and one or more solar modules mounted on the frame, such frames typically being formed of metal, most commonly aluminum. The roof structure usually contains roof rafters and a plywood base which is nailed to the roof rafters. In many cases, a surface material, e.g., asphalt shingles may be attached to the exposed side of the roof structure. Roof structures, e.g., of plywood, generally have coefficients of thermal expansion which differ significantly from those of the solar module frames, e.g., frames made of aluminum. Extreme differences in thermal expansion between the roof structure and the frame result, especially over the course of winter/summer and day/night cycles. These differences in thermal expansion result in substantial stresses and can result in undesirable loosening of the bolts and/or screws, potentially causing a variety of problems, including water leakage through the roof structure and/or rotting of the surrounding wood, in addition to degradation of the strength of the attachment of the frame to the roof structure.

In larger solar collector installations, and with substructure framing of material with high expansion coefficients (e.g., aluminum is often used because of its light weight and high tensile strength), the difference in expansion can easily amount to more than one centimeter for solar collectors extending over more than 10 meters in width or height, assuming that the substructure reaches minimal temperatures (e.g., in winter) of −10° C. and maximal temperatures (e.g., in summer of 80° C. In addition to such a large annual differential thermal expansion cycle, a daily cycle (e.g., in the summer, where the difference between the low temperature at night and a high temperature in a sun-exposed midday can readily reach more than 50° C.) can also cause an unacceptably large stress on bolts or screws. This differential expansion can cause severe damage to the roof structure. Such damage may go unnoticed for many years, since it may not be readily physically observable, e.g., because the damage is hidden beneath the solar modules. As a result, while significant damage may occur in the initial temperature cycle, such damage can also accumulate over time, producing costly damage in the roof structure, as well as a potential for the collectors to become loose and possibly dislodge from the roof structure.

Conventional applications have employed several much smaller frames that are spaced from each other appropriately to absorb the differential thermal expansion, thereby reducing, but not eliminating, the stress around each bolt or screw. Thermal expansion and/or contraction of such applications generally results in the presence of uneven spaces between collectors. Collectors are desirably mounted as closely together as possible in order to maximize solar collection area, and as a result, even small differences in spacings between collectors sharply detract from the aesthetic qualities of the arrangement of collectors.

Another factor which affects the aesthetic qualities of an arrangement of solar modules is the distance between the solar modules and the support structure (e.g., a roof or wall). With larger distances from the modules to the support structure, non-uniformities in the modules and/or in the mounting hardware are magnified, increasing the negative aesthetic effects of the non-uniformities brought on by temperature changes.

Despite the variety of conventional assemblies which have been used to mount countless solar modules, there remains a need for articles which can be used to reliably mount a solar module on a support structure of any construction, while further reducing or eliminating differential thermal expansion-induced mechanical stresses between the support structure and the frame of the solar collector. There also remains a need for articles which can be used to mount an array of solar modules on a horizontal, tilted or vertical structure surface and provide a homogenous, continuous appearance. There is also an ongoing need for articles which can be used to mount solar modules and which are of a minimum size (thereby minimizing material costs, simplifying handling, reducing weight and reducing shipping costs), which are readily packaged, which are quickly and easily installed, and in which parts can be easily replaced, if ever necessary. The articles and methods of the present invention, as described herein, satisfy these needs.

SUMMARY OF THE INVENTION

In accordance with the present invention, there are provided solar module brackets and profile channels as described herein.

For mounting one or more solar module on a support structure, two or more profile channel engagement hooks are attached to or integral with a frame on which the solar module is mounted. Two or more profile channels are attached to or integral with the support structure, e.g., a roof structure, each profile channel having at least one opening. To mount the solar module on the support structure, each profile channel engagement hook is engaged in an opening in a profile channel such that a neck portion of each profile channel engagement hook extends through the opening in the profile channel. Each profile channel preferably comprises at least two holes, so that a hardware connector may be inserted through each of the holes, the hardware connectors attaching the profile channel to the support structure.

In accordance with the present invention, differences in thermal expansion do not result in unacceptable mechanical stresses because the profile channel engagement hooks have sufficient room to move within the openings in the profile channels. In addition, in a preferred aspect of the invention, one or more of the holes are elongated, and the difference between the thermal expansion of the profile channel and the thermal expansion of the support structure results in movement of one or more of the hardware connectors within the elongated opening in which it is mounted, thereby reducing or avoiding thermal expansion-induced stress between the profile channel relative to the support structure.

The present invention thus further provides an array of solar modules mounted on a horizontal, tilted or vertical structure surface, providing a homogenous, continuous appearance. The articles used to mount solar modules reduce material demand by avoiding the need for any horizontal interconnecting frame material. In addition, the articles of the present invention are easily shipped because they include simple linear articles. Also, the installation of the articles for use in mounting of solar modules is very simple, and individual pieces can be readily replaced, if ever necessary.

There are also provided methods of making such solar collectors and methods of mounting such solar collectors on support structures.

BRIEF DESCRIPTION OF THE DRAWING FIGURES

FIG. 8b is a front view of the solar module bracket of FIG. 8a.

DETAILED DESCRIPTION OF THE INVENTION

The solar modules of the present invention can be selected from all kinds of solar modules, e.g., any kind of solar thermal module, or any kind of solar electrical cells such as p-n photo cells, amorphous photo cells, photoelectrochemical photo cells, MIS photo cells, and others, including any desired substrate, superstrate or other laminate or encapsulant, e.g., as disclosed in U.S. Pat. Nos. 5,057,163, 5,266,125, 5,336,335 and 5,828,088, the entireties of which are hereby incorporated by reference.

The solar collectors of the present invention include at least one solar module and a solar module frame which holds or is attached to the solar module(s) (or a structure to which the solar module(s) is attached or in which the solar module (s) is contained). A solar electrical module, as used herein, can contain a single photovoltaic cell or, as is currently typical, a plurality of cells (e.g., 36 half-volt cells) which are electrically interconnected.

An important factor in mounting solar modules is the orientation of the modules, i.e., the orientation (relative to the earth's surface) of the surface of the solar module which faces the sun. In some cases, the support structure, e.g., a roof surface, has a degree of slope which is suitable for solar collection, i.e., the solar modules can be mounted with their solar facing surfaces substantially parallel to the roof surface. However, it is often necessary to mount solar modules on horizontal or vertical surfaces, and surfaces having such orientations (i.e., tangential to the earth's surface to or normal to the earth's surface) are generally not desirable for solar collection. In addition, with a tilted surface, depending on the orientation of the tilted surface, it may be desirable for the orientation of the modules to differ to some extent from that of the tilted surface.

In an embodiment for mounting solar modules on a surface which has a desirable orientation, a plurality of solar collectors are arranged side-by-side and end-to-end in a number of parallel columns. In this embodiment, a plurality of profile channels are arranged in parallel columns on a support structure, e.g., a sloping roof. The profile channels are preferably arranged such that the columns extend up the roof perpendicularly to the top line of the roof, and the solar collectors, which are preferably substantially rectangular, are usually arranged such that their shorter sides are parallel to the top line of the roof (i.e., the longer sides are parallel to and adjacent to profile channels). Two or more solar module brackets are attached to or integral with each of the long sides of the solar collectors, and pairs of profile channel engagement hooks of solar module brackets of neighboring solar collectors are positioned in openings in the profile channels. Each of the openings provided in the profile channels is wide enough to accommodate, side-by-side, a pair of profile engagement hooks, one from each of two neighboring solar collectors. In the case of the profile channels on the far right and far left sides of the arrangement, only one "unpaired" profile engagement hook will be present (i.e., an engagement hook on the right side of the collector farthest to the right will be present in the left side of the opening of the profile channel farthest to the right, but there is no collector to the right of that profile channel, and likewise on the left side of the arrangement). Accordingly, it is possible to provide profile channels on the sides of the arrangement which have openings of a size which will accommodate only the single profile channel engagement hook; however, it is generally preferred to have all profile channels be of a similar construction, e.g., to reduce cost and to increase interchangeability of parts. Where all profile channels are of similar construction, i.e., have openings of uniform size, the unpaired profile channel engagement hooks fit into openings (in profile channels on the sides of the arrangement) of a size which could accommodate two profile channel engagement hooks, but such extra space does not cause excessive looseness because (assuming there are at least two columns in the arrangement of collectors) the profile channel engagement hooks on the opposite side of the collector fit into openings together with profile channel engagement hooks from the neighboring collector. In this embodiment (i.e., on a tilted roof), or where the solar modules are mounted on a vertical support surface, the hooks preferably point down (i.e., parallel to the plane of the roof and toward the low edge of the roof) within the openings, whereby the solar collectors are held in place by the force of gravity pushing the neck portions of the profile channel engagement hooks against the lower walls of the openings in the profile channels. The uppermost end of the uppermost module in each column is preferably provided with a stopper bracket to assist in maintaining proper positioning, as discussed below. A similar arrangement can be provided on a flat surface, in which case the direction of the profile channel engagement hooks is not critical. In the case of an arrangement of collectors mounted on a flat surface, stopper brackets, discussed below, are preferably provided on one side of the arrangement to prevent movement of the collectors beyond a specific location, with movement of the collectors on the other side of the arrangement being limited by engagement of profile channel engagement hooks with openings in profile channels.

The articles according to the present invention allow for the solar modules to be mounted much closer to the surface of the support structure, e.g., with a space of about 1 inch; conventionally there is a space of at least about 3 inches. Such reduction in the space can provide important aesthetic benefits, e.g., the avoidance of a "box-like" appearance of an arrangement of solar modules mounted on a support structure. Also, the area though which air can flow beneath the solar modules can be reduced according to the present invention, and in the case of a thermal solar module, a reduction in energy loss through heat transfer with such air can be realized.

There are also preferred embodiments in which solar modules are mounted so that they will have orientations relative to the surface of the earth (and correspondingly relative to the sun) which differ from that of the surface of the support structure on which the solar module is mounted. For example, in a preferred embodiment, each profile channel has a support structure engaging surface and a collector supporting surface, the collector supporting surface having an orientation which is different from that of the support structure engaging surface. In one example corresponding to this embodiment, a plurality of solar collectors are mounted on a horizontal surface, and (due to the selected relative orientation of the support structure engaging surface and the collector supporting surface of the profile channel) the solar facing surfaces of the modules are tilted to the selected desirable orientation relative to the sun. In these embodiments as well, profile channel engagement hooks are attached to or integral with solar module frames in which solar modules are positioned, and each of the openings provided in the profile channels is wide enough to accommodate, side-by-side, a pair of profile engagement hooks, one from each of two neighboring solar module frames. In embodiments where the support surface is sloped, likewise it may be desirable, in a similar manner, to select a specific relative orientation between the support structure engaging surface of the profile channel and the collector supporting surface of the profile channel so as to provide a desired orientation of the solar facing surface of the module.

Figure 1:
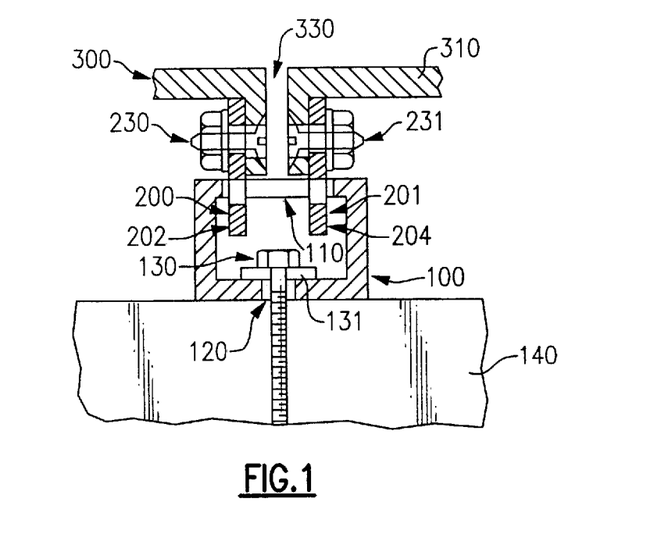
FIG. 1 is a partial sectional view of a pair of solar collectors mounted on a in profile channel which is attached to a support structure according to a first embodiment of the present invention.

FIG. 1 is a sectional view of a profile channel according to an embodiment of the present invention. In FIG. 1, a profile channel 100 is attached to a horizontal, tilted or vertical support structure 140 using a hardware connector 130 inserted through a hole 120 in the profile channel and into the support structure 140. A first solar module bracket 200 having a profile channel engagement hook 202 is attached by a hardware connector 230 to a first solar module frame 300 of a first photovoltaic collector. The solar module bracket 200 is positioned such that the profile channel engagement hook 202 is located in an opening 110 in the profile channel 100. A second solar module bracket 201 is attached by a hardware connector 231 to a second solar module frame 310 of an adjacent second photovoltaic collector. The second solar module bracket 201 has a profile channel engagement hook 204 which is also positioned in the opening 110 in the profile channel 100. The dimension of the opening 110 is designed to accommodate two profile channel engagement hooks 202 and 204, and also leave a sufficient space 330 between the two adjacent solar collectors to accommodate for thermal expansion. The required size of the space 330 can be determined in view of the sizes of the solar collectors and the materials out of which the solar collectors are made. Preferably, the space 330 is in the range of from about 1 mm to about 2 mm (measured at ambient temperature), although it can be larger if the size of the collectors and materials necessitate such a larger space.

The profile channels preferably do not exceed about 10 meters, and more preferably do not exceed about 5 meters, to avoid excessive stress due to differential thermal expansion that may be difficult to absorb with elongated slits and sliding screws. For a set of solar modules that exceed such height, two or more profile channels may be used, separated by a small expansion slit of appropriate width, typically from about 4 mm to about 6 mm (measured at ambient temperature). In such an embodiment, it may be useful to identify each profile channel as a lower profile channel or an upper profile channel, e.g., to avoid excessive slits between the solar collectors.

In addition to satisfying the need to accommodate for differences in thermal expansion, the present invention has the advantages relative to other installation structures of greater simplicity and of permitting a low profile of the total installation above the roof surface, as well as a rather close proximity between adjacent collectors. This makes the total installation more aesthetically pleasing.

It should be recognized that there can be roofing or other materials, e.g., asphalt or wood shingles or the like positioned between the solar module bracket and the support structure.

Each profile channel is attached to the support structure using hardware connectors mounted through holes in the profile channel. These holes in the profile channel may be shaped so as to substantially prevent relative motion between a hardware connector and the corresponding hole in the profile channel through which it is mounted; alternatively, any of the holes may be shaped so as to allow for a selected amount of relative movement between the profile channel and the support structure.

Figure 2A:
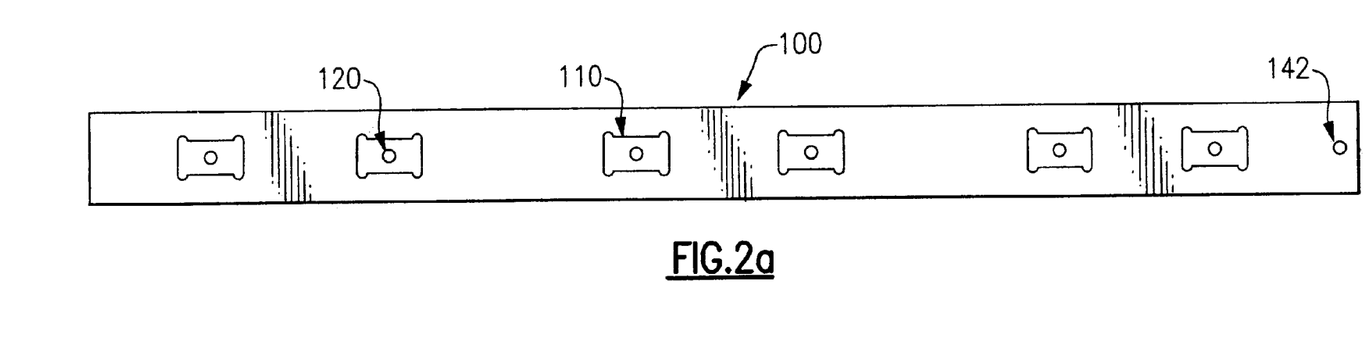
FIG. 2a is a top view of a profile channel according to the first embodiment.

For example, FIG. 2a is a top view of an embodiment of a profile channel 100. The profile channel 100 includes an array of openings 110. When solar modules are being mounted, the respective pairs of adjacent profile channel engagement hooks are inserted into each of the openings 110. The openings 110 are preferably substantially rectangular or square. An additional array of holes 120, aligned with the openings 110, are preferably provided in the bottom surface of the profile channel 100 to allow for the attachment of the profile channel to a horizontal, tilted or vertical support structure. The size of the openings 110 is sufficient to allow access to the hole in the back for the required attachment hardware connector 130. FIG. 2a also depicts the placement of a hole 142 in the profile channel 100 to accommodate the attachment of a module stopper bracket 240, discussed below in connection with FIGS. 5a and 5b. The end of the profile channel with the hole 142 is preferably deployed at the top of a tilted or vertical support structure (or at an edge of a horizontal support structure) on which the profile channel 100 is mounted. The module stopper bracket 240 holds a string of mounted modules in place.

Figure 2B:
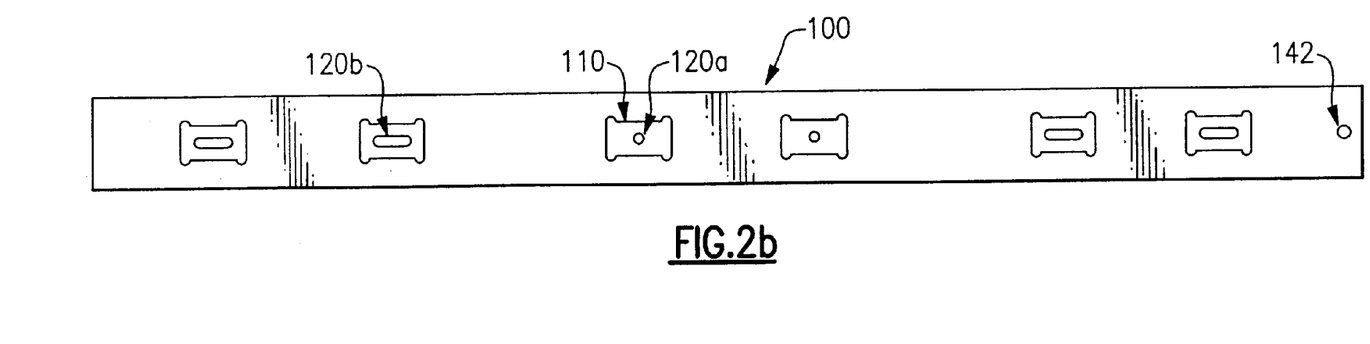
FIG. 2b is a top view of a profile channel according to a second embodiment.

FIG. 2b is another embodiment of a profile channel according to the present invention. The profile channel shown in FIG. 2b is similar to that shown in FIG. 2a, except that in FIG. 2b, the holes 120 include round holes 120a and elongated holes 120b. In embodiments where the thermal expansion of the profile channel does not closely match that of the support structure (to which the profile channel is to be attached), an embodiment as in FIG. 2b is especially useful. In FIG. 2b, the elongated holes 120b in the profile channel 100, through which hardware connectors 130 connect the profile channel 100 to the support structure 140, are elongated in the direction parallel to the long axis of the profile channel 100 and/or along an imaginary axis defined along the centers of the holes 120b, so that differential expansion and/or contraction of the profile channel 100 relative to the support structure 140 results in each hardware connector 130 sliding within the corresponding hole 120b, thus avoiding stress resulting from such differential expansion and contraction. The elongated holes 120b are of a substantially uniform width, so that motion of each elongated hole 120b relative to the hardware connector 130 mounted therethrough, is restricted to substantially linear motion. As also shown in the embodiment depicted in FIG. 2b, the two holes 120a nearest to the center of the profile channel 100 are substantially round and of a size which substantially prevents lateral movement of the corresponding hardware connector 130 relative to the hole 120a, i.e., movement in a direction perpendicular to the axis of the hardware connector 130 and the hole 120a. An example of a typical suitable size for the long dimension of the elongated holes 120b in a profile channel made of aluminum and for mounting on a plywood support structure is from about 0.2 mm to about 0.8 mm per meter from the center of the profile channel. Each hardware connector 130 mounted in one of the elongated holes 120b of the profile channel 100 is preferably fixed to the roof with a force which allows for motion of that hardware connector 130 relative to the elongated hole 120b. The hardware connector 130 may further include a washer 131 (e.g., of Teflon) or any other article that facilitates sliding of a hardware connector 130 (e.g., a screw or bolt) along the long axis of an elongated hole 120b. In the embodiments of both FIG. 2a and FIG. 2b, because relative movement between the round holes 120a and the corresponding hardware connectors 130 is substantially prevented, translational movement of the profile channel 100 relative to the support structure (i.e., movement of the center of the profile channel 100 relative to the support structure) is substantially prevented. Likewise, angular movement of the profile channel 100 relative to the support is substantially prevented. This substantial prevention of translational and angular movement of the profile channel relative to the support structure provides important aesthetic features. In particular, the substantial prevention of translational and angular movement minimizes irregularities in spacings between adjacent collectors, thereby dramatically improving the appearance of the mounted assemblies. In addition, most roof structures have deviations from planarity ("surface wiggles"), which generally compound any irregularities in the materials mounted on such roof structures, and which may cause conventionally mounted modules to shift-such surface wiggles present another feature whose otherwise negative aesthetic effects can be minimized or eliminated by the articles provided by the present invention. In addition, where surface wiggles are present, it may be preferable to insert shims, e.g., small pieces of asphalt or other material, to provide slight elevation (e.g., as much as ¼ inch) where needed to compensate for such surface wiggles.

Figure 3A:
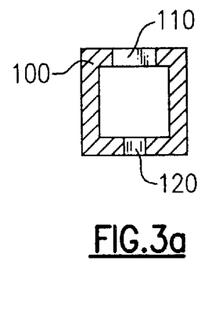
FIGS. 3a, 3b and 3c are sectional views of three embodiments of profile channels according to the present invention.
Figure 3B:
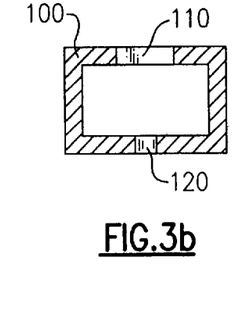
Figure 3C:
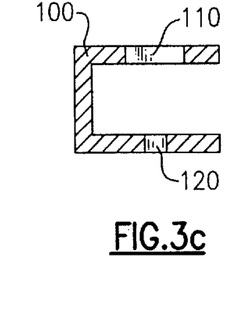

FIGS. 3a, 3b and 3c show cross-sectional views of examples of square, rectangular, and U-shaped profile designs for the profile channels 100. Shown for each are the openings 110 (to accommodate profile channel engagement hooks) and the holes 120 in the bottom (to accommodate the mounting hardware connectors 130 for attachment of the profile channel to the horizontal, tilted or vertical support structure).

Figure 4A:
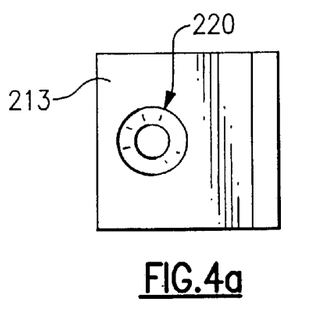
FIGS. 4a, 4b and 4c are a top view, a right side view and a front view, respectively, of a solar module bracket according to an embodiment of the present invention.
Figure 4B:
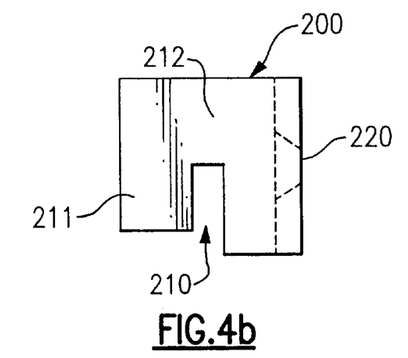
Figure 4C:
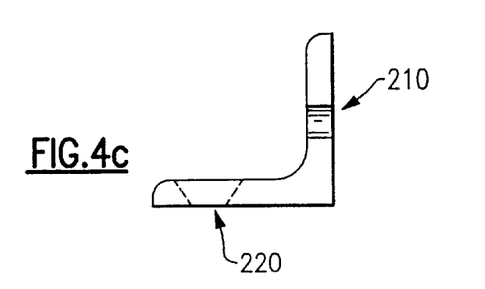

FIGS. 4a, 4b and 4c show views of an embodiment of a solar module bracket 200 and the placement of a hole 220 to accommodate the hardware connector 230 (shown in FIG. 1) for attaching the solar module bracket 200 to the solar module frame 300 (shown in FIG. 1). The solar module bracket 200 comprises an attachment portion 213 a neck portion 212 and a foot portion 211. Two complementary brackets of this design (ones that are "left-configured" and others that are "right-configured") are required to be attached on the two different sides of the collector to be mounted.

Figure 5A:
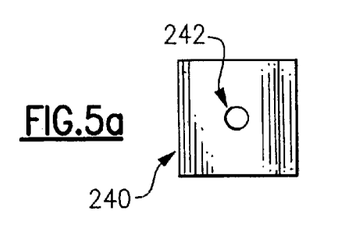
FIGS. 5a and 5b are a top view and a front view, respectively, of a stopper bracket according to an embodiment of the present invention.
Figure 5B:
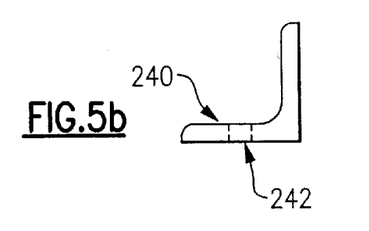

FIGS. 5a and 5b are views of an embodiment of a module stopper bracket 240, the module stopper bracket 240 having a hole 242 which is lined up with the hole 142 in the profile channel (see FIGS. 2a and 2b) for connection of the bracket to the profile channel using appropriate hardware.

Figure 6A:
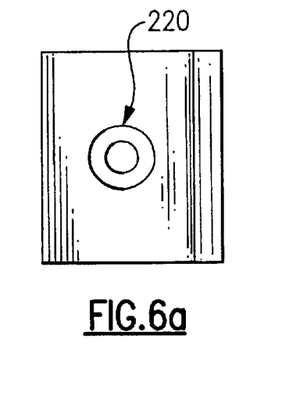
FIGS. 6a, 6b and 6c are a top view, a right side view and a front view, respectively, of a solar module bracket according to another embodiment of the present invention.
Figure 6B:
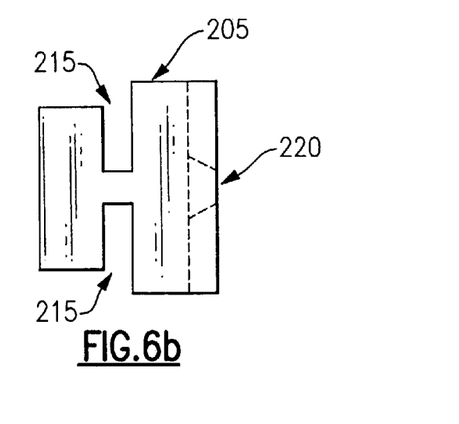
Figure 6C:
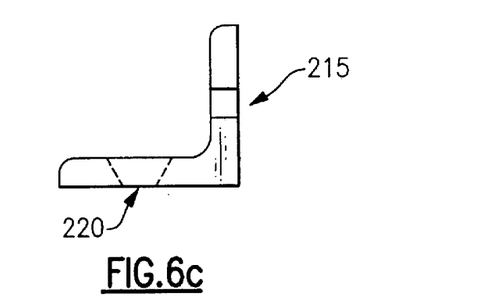

FIGS. 6a, 6b and 6c depict views of another embodiment of a solar module bracket 205. Solar module bracket 205 includes a pair of slots 215 that eliminates the need to have two different single-slotted solar module brackets (ones that are "left-configured" and others that are "right-configured") to mount the solar collector on the profile channel. The double-slotted solar module bracket 205 also permits the installation of the solar modules with the electrical connections at the top or bottom edge of the solar array installation.

Figure 7:
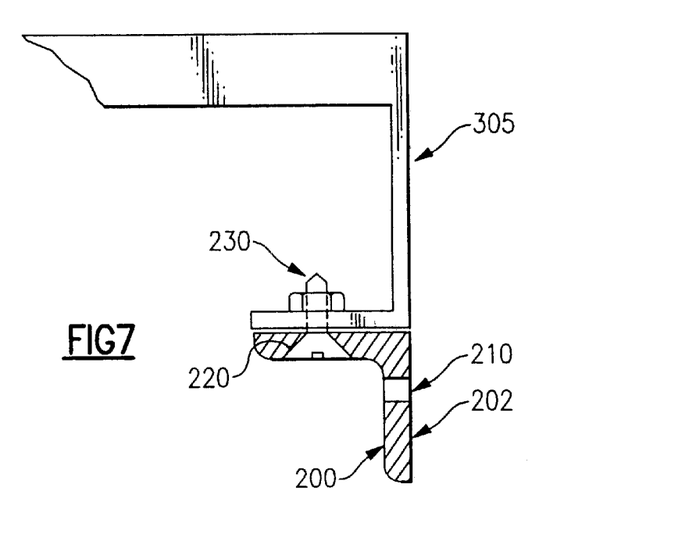
FIG. 7 is a side view of an embodiment of a solar module bracket attached to a solar module frame according to the present invention.

FIG. 7 shows another embodiment of a solar module bracket 200, its hardware connector 230 and attachment slot 210 where the solar module frame 305 is in the shape of a U. As shown in FIG. 7, the hole 220 is shaped so as to receive the head of the hardware connector 230, to provide a rather smooth surface between the solar module bracket and the hardware to allow easy sliding of the profile channel engagement hook 202 into the profile channel.

Figure 8A:
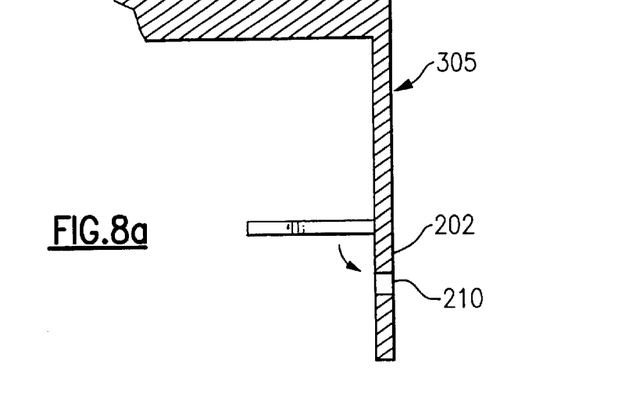
FIG. 8a is a side view of an embodiment of a solar module bracket which is integral with a solar module frame according to the present invention.
Figure 8B:
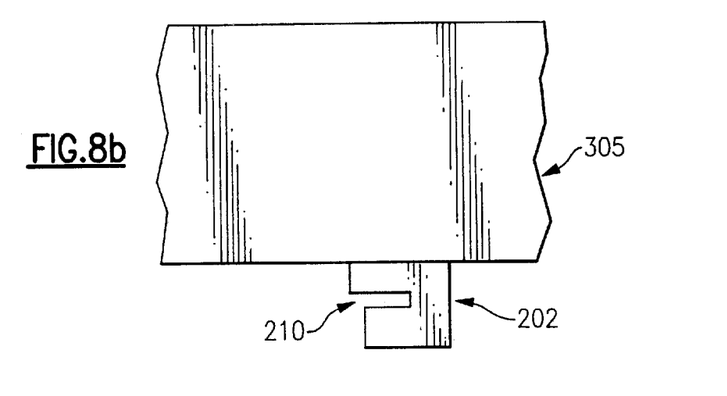

FIGS. 8a and 8b show a front view and a side view, respectively, of a solar module frame 305 having a U-shaped border with a bend-down solar module bracket 202 that has a recessed slot 210 for attachment to a profile channel.

Figure 8C:
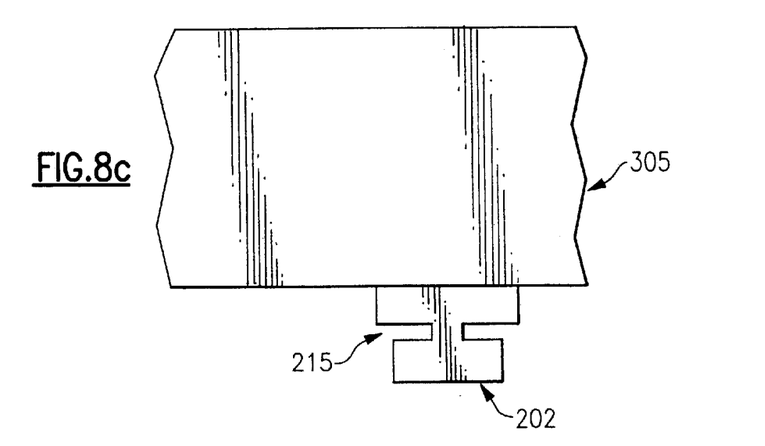
FIG. 8c is a front view of another embodiment of a solar module bracket which is integral with a solar module frame according to the present invention.

FIG. 8c shows a side view of a solar module frame 305 having a U-shaped border with a bend-down solar module bracket 202 that has two recessed slots 215 for attachment to a profile member.

Figure 9:
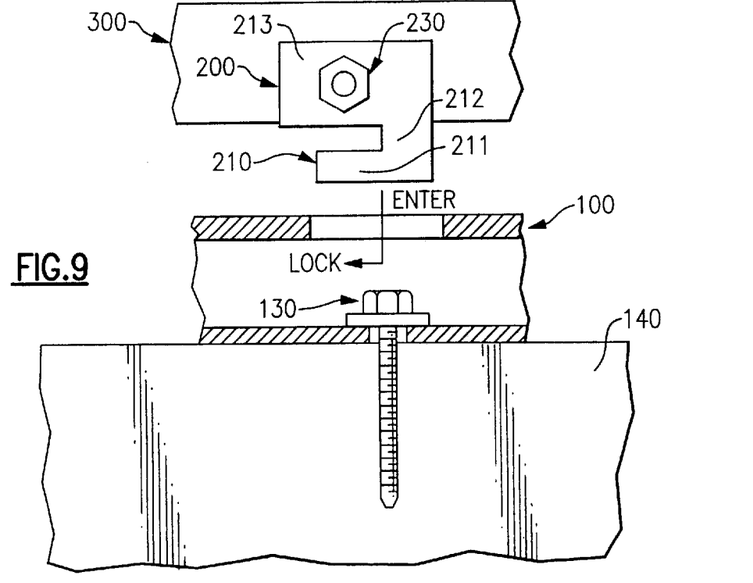
FIG. 9 is a partial sectional view of a solar module mounted on a profile channel which is ready to be attached to a support structure according to another embodiment of the present invention.

In accordance with the present invention, solar collectors are secured on profile channels by solar module brackets, that are dropped into openings in the profile channels and moved downward (where the support structure is vertical or tilted) or laterally (where the support structure is horizontal), so that the collector cannot be lifted up (see FIG. 9). FIG. 9 is a front sectional view of a solar collector 300 with a solar module bracket 200 attached with the appropriate hardware connector 230 in a position ready to be lowered into an opening 110 in the profile channel 100, the profile channel 100 being attached by a hardware connector 130 to a horizontal, tilted or vertical support structure. The solar module bracket 200 comprises an attachment portion 213, a neck portion 212 and a foot portion 211. The slot in the solar module bracket 200 is offset 210 (i.e., in FIG. 9, the width of the foot portion 211 of the solar module bracket 200 is smaller than the width of the opening 110) to enable the easy entry of the solar module bracket 200 into the opening 110.

Figure 10:
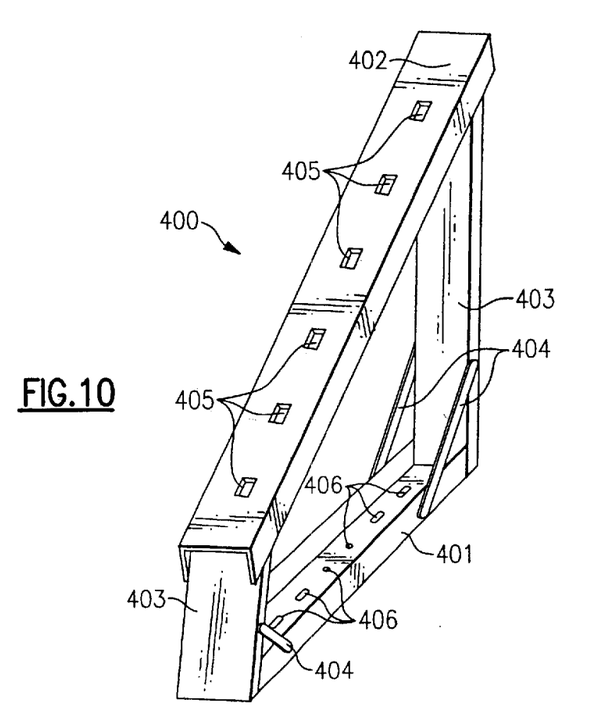
FIG. 10 is a perspective view of another embodiment of a profile channel according to the present invention.

FIG. 10 is a perspective view of an embodiment of a profile channel which has a support structure engaging surface and a collector supporting surface, the collector supporting surface having an orientation which is different from that of the support structure engaging surface, for use in mounting solar modules such that the solar facing surfaces of the modules is of an orientation which differs from that of the support structure. In the embodiment of FIG. 10, the profile channel 400, i.e., the overall structure shown in FIG. 10, includes a support structure engaging surface 401, a collector supporting surface 402, and connecting members 403. The profile channel 400 preferably further includes angle supports 404. The module supporting surface 402 includes openings 405, each of which accommodates, side-by-side, a pair of profile channel engagement hooks, one attached to or integral with one solar module frame, the other attached to or integral with a neighboring solar module frame. The support structure engaging surface 401 has holes 406 through which it can be attached to the support structure, e.g., using a hardware connector as discussed above. One or more of the holes 406 can be elongated as discussed above. A wide variety of other constructions can be employed to provide a profile channel in which there are a support structure engaging surface and a collector supporting surface, the collector supporting surface having an orientation which is different from that of the support structure engaging surface.

In an arrangement where a plurality of profile channels 400 are arranged on a support surface in order to mount a plurality of collectors in a number of rows and columns, the arrangement can be stabilized, e.g., against wind blowing side to side in the plane of FIG. 10, by stabilizing the profile channels 400 on the opposite ends of each row in the overall arrangement. For example, a profile channel 400 can be stabilized using a stabilizer attached to the support structure and one side of the profile channel. The frame of each collector provides lateral stability between the profile channels which support opposite sides of the collector, and so by providing stability to the outer sides of profile channels at the opposite ends of a row of collectors, the entire row of collectors is stabilized, without the need to provide a crossbar or other stabilizer laterally across the columns in the arrangement.

Solar module brackets, solar module frames and profile channels according to the present invention can be formed of any suitable material. Preferred materials include metals, a particularly preferred metal being aluminum due to its light weight and high tensile strength. The solar module brackets, solar module frames and profile channels in an arrangement of solar collectors are frequently made of the same material in order to avoid corrosion caused by any electrochemical potential (as is well known in the art, however, certain materials can be employed in contact with certain other different materials, e.g., stainless steel can be employed in contact with aluminum, without causing significant corrosion). In the event that any of these items are made of different materials, e.g., which result in substantially zero electrochemical potential, any differences in thermal expansion properties would need to be taken into account in the design.

It should be recognized that any structure described or shown herein as a single structure can readily be replaced by a plurality of structures connected together so as to provide the same function, and likewise, any structure described or shown herein as two or more connected structures can readily be replaced by a single integral structure which provides the same function.

Although the solar collectors, mounting apparatus and methods in accordance with the present invention have been described in connection with preferred embodiments, it will be appreciated by those skilled in the art that modifications not specifically described may be made without departing from the spirit and scope of the invention defined in the following claims.

What is claimed is:

1. A solar collector comprising:
    at least one solar module having at least one solar collection surface;
    at least one solar module frame, said solar module frame supporting said solar module; and
    at least two profile channel engagement hooks, each profile channel engagement hook comprising an attachment portion which is attached to or integral with said solar module frame, each profile channel engagement hook further comprising a neck portion and a foot portion, said neck portion extending from said attachment portion to said foot portion, said foot portion being farther from said solar collection surface than at least a portion of said neck portion in a direction perpendicular to said solar collection surface, said foot portion having a foot portion cross-sectional area in a first plane which is larger than a cross-sectional area of said neck portion in a second plane parallel to said first plane.

2. The solar collector of claim 1, wherein said profile channel engagement hooks are part of a solar module bracket which is integral with said solar module frame.

3. The solar collector of claim 1, wherein said profile channel engagement hooks are part of a solar module bracket which is rigidly attached to said solar module frame.

4. The solar collector of claim 1, wherein said solar module is a solar electrical module.

5. The solar collector of claim 1, wherein said solar module is a solar thermal module.

6. The solar collector of claim 1, further comprising a support structure and at least two profile channels, each profile channel being attached to or integral with said support structure, each profile channel having at least one opening, each profile channel engagement hook engaging a said opening in one of said profile channels such that said neck portion extends through said opening in the profile channel.

7. The solar collector of claim 6, wherein each profile channel further comprises at least one elongated hole and at least one tight-fitting hole, said elongated hole being elongated in a direction substantially parallel to an imaginary line segment drawn between centers of each of said elongated hole and said tight-fitting hole, a first hardware connector being positioned in said elongated hole and being connected to said support structure, whereby motion of said first hardware connector within said elongated hole and perpendicular to an axis of said hardware connector is permitted, a second hardware connector being positioned in said tight-fitting hole, whereby motion of said second hardware connector relative to said tight-fitting hole and perpendicular to said second hardware connector is substantially prevented.

8. The solar collector of claim 6, wherein each profile channel has a support structure engaging surface and a module supporting surface, said support structure engaging surface having an engaging surface orientation, said module supporting surface having a module supporting surface orientation which is different from said engaging surface orientation of said support structure engaging surface.

9. The solar collector of claim 6, wherein each of said profile channel engagement hooks is side-by-side with a profile channel engagement hook from a neighboring solar collector within a said opening in one of said profile channels.

10. The solar collector of claim 6, wherein each profile channel has a collector supporting surface, a surface of said support structure being substantially parallel to said collector supporting surface.

11. The solar module of claim 6, further comprising a stopper bracket attached to each profile channel.

12. A solar collector comprising:
   at least one frame, said frame comprising a module supporting surface and at least one solar module bracket;
   at least one solar module positioned on said module supporting surface, said solar module having at least one solar collection surface;
   at least two profile channel engagement hooks, each profile channel engagement hook comprising an attachment portion, a neck portion and a foot portion, said attachment portion being attached to or integral with said frame, said neck portion extending from said attachment portion to said foot portion, said foot portion being farther from said solar collection surface than at least a portion of said neck portion in a direction perpendicular to said solar collection surface, said foot portion having a foot portion cross-sectional area in a first plane which is larger than a cross-sectional area of said neck portion in a second plane parallel to said first plane;
   a support structure; and
   at least one profile channel, said profile channel having a support structure engaging surface and a module supporting surface, said support structure engaging surface being attached to or integral with said support structure and having an engaging surface orientation, said module supporting surface having at least one opening, each profile channel engagement hook engaging an opening such that said neck portion extends through said opening,
   said module supporting surface having a module supporting surface orientation which is different from said engaging surface orientation of said support structure engaging surface.

13. The solar collector of claim 12, wherein said profile channel further comprises at least one elongated hole and at least one tight-fitting hole, said elongated hole being elongated in a direction substantially parallel to an axis of said support structure engaging surface, a first hardware connector being positioned in said elongated hole and being connected to said support structure, whereby motion of said first hardware connector within said elongated hole and perpendicular to an axis of said hardware connector is permitted, a second hardware connector being positioned in said tight-fitting hole, whereby motion of said second hardware connector relative to said tight-fitting hole and perpendicular to said second hardware connector is substantially prevented.

14. The solar collector of claim 12, wherein each of said profile channel engagement hooks is side-by-side with a profile channel engagement hook from a neighboring solar collector within a said opening in one of the profile channels.

15. A solar collector comprising:
   at least one frame comprising at least two profile channel engagement hooks;
   at least one solar module positioned on said frame, said solar module having at least one solar facing surface;
   each profile channel engagement hook comprising an attachment portion, a neck portion and a foot portion, said attachment portion being attached to or integral with said frame, said neck portion extending from said attachment portion to said foot portion, said foot portion being farther from said solar facing surface than at least a portion of said neck portion in a direction perpendicular to said solar facing surface, said foot portion having a foot portion cross-sectional area in a first plane which is larger than a cross-sectional area of said neck portion in a second plane parallel to said first plane;
   a support structure having a support structure surface; and
   at least two profile channels attached to or integral with said support structure, each profile channel having at least one opening, each profile channel engagement hook engaging an opening such that said neck portion extends through said opening,
   said support structure surface being substantially parallel to said solar facing surface.

16. A method of mounting a solar collector, comprising:
   attaching a solar module bracket comprising a profile channel engagement hook to a solar module frame, said solar module frame supporting at least one solar module having at least one solar collection surface, said profile channel engagement hook comprising an attachment portion, a neck portion and a foot portion, said attachment portion being attached to or integral with said frame, said neck portion extending from said attachment portion to said foot portion, said foot portion being farther from said solar collection surface than at least a portion of said neck portion in a direction perpendicular to said solar collection surface, said foot portion having a foot portion cross-sectional area in a first plane which is larger than a cross-sectional area of said neck portion in a second plane parallel to said first plane.

17. The method of claim 16, wherein said solar module is a solar electrical module.

18. The method of claim 16, wherein said solar module is a solar thermal module.

19. The method of claim 16, further comprising inserting said foot portion into an opening in a profile channel attached to or integral with a support structure.

20. A method of mounting a solar collector on a support structure, said solar collector having at least one solar module having at least one solar collection surface, the method comprising inserting at least one profile channel engagement hook into an opening in a profile channel, said at least one profile channel engagement hook comprising an attachment portion which is attached to or integral with a solar module frame, said solar module frame supporting said solar module, each profile channel engagement hook further comprising a neck portion and a foot portion, said neck portion extending from said attachment portion to said foot portion, said foot portion being farther from said solar collection surface than at least a portion of said neck portion in a direction perpendicular to said solar collection surface, said foot portion having a foot portion cross-sectional area in a first plane which is larger than a cross-sectional area of said neck portion in a second plane parallel to said first plane, said profile channel being attached to or integral with a support structure.

21. The method of claim 20, wherein said profile channel further comprises at least one elongated hole and at least one tight-fitting hole, said elongated hole being elongated in a direction substantially parallel to an imaginary line segment drawn between centers of each of said elongated hole and said tight-fitting hole, a first hardware connector being positioned in said elongated hole and being connected to said support structure, whereby motion of said first hardware connector within said elongated hole and perpendicular to an axis of said hardware connector is permitted, a second hardware connector being positioned in said tight-fitting hole, whereby motion of said second hardware connector relative to said tight-fitting hole and perpendicular to said second hardware connector is substantially prevented.

22. The method of claim 20, wherein each profile channel has a support structure engaging surface and a module supporting surface, said support structure engaging surface having an engaging surface orientation, said module supporting surface having a module supporting surface orientation which is different from said engaging surface orientation of said support structure engaging surface.

23. The method of claim 20, wherein said profile channel engagement hook is side-by-side with a profile channel engagement hook from a neighboring solar collector within said opening in said profile channel.

* * * * *